Sept. 18, 1928.
E. M. PIERCE ET AL
1,684,926
PREDETERMINER AND INDICATOR
Filed Dec. 14, 1926     7 Sheets-Sheet 6
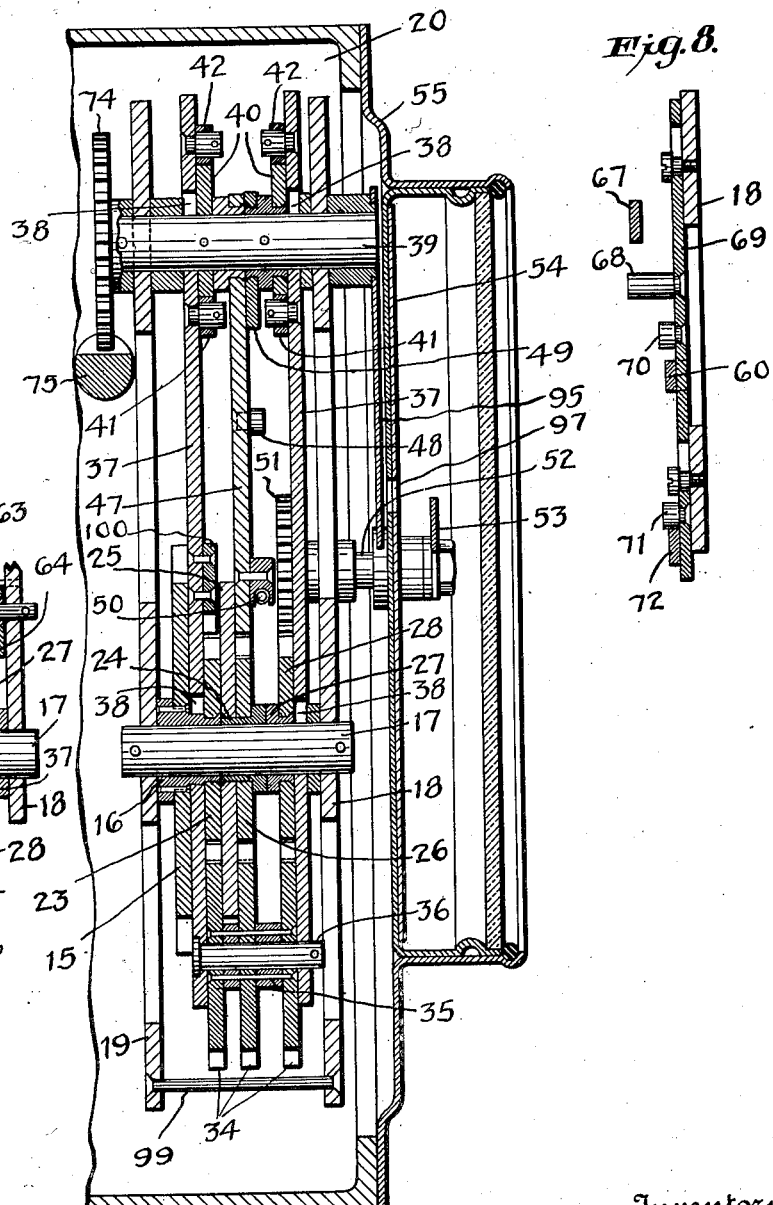
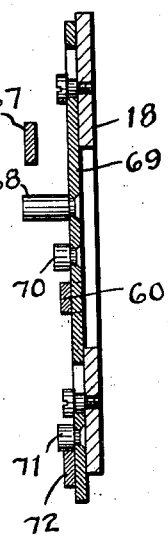
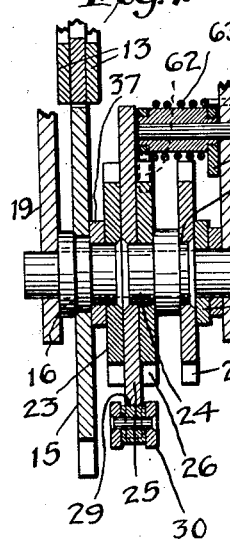

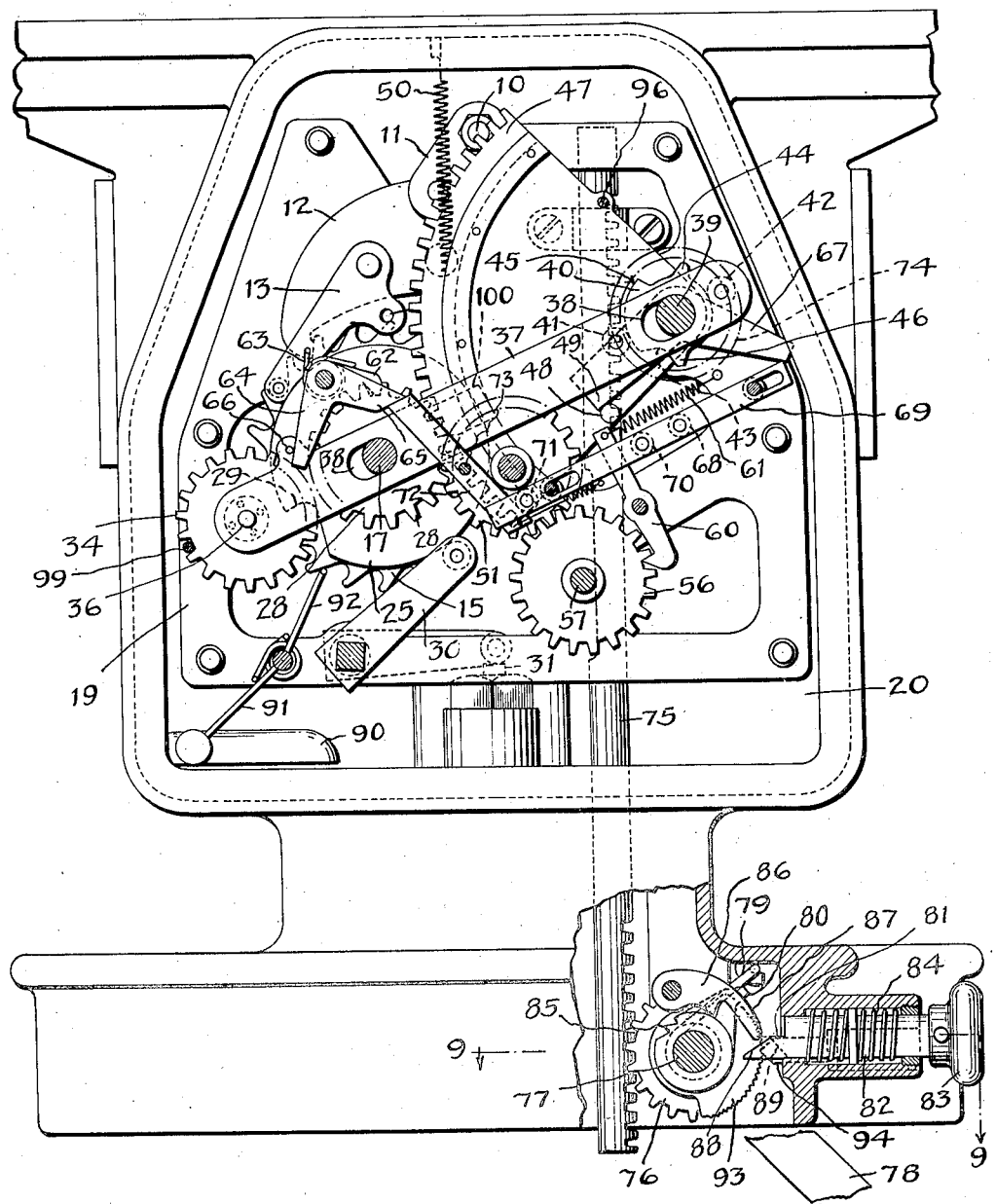

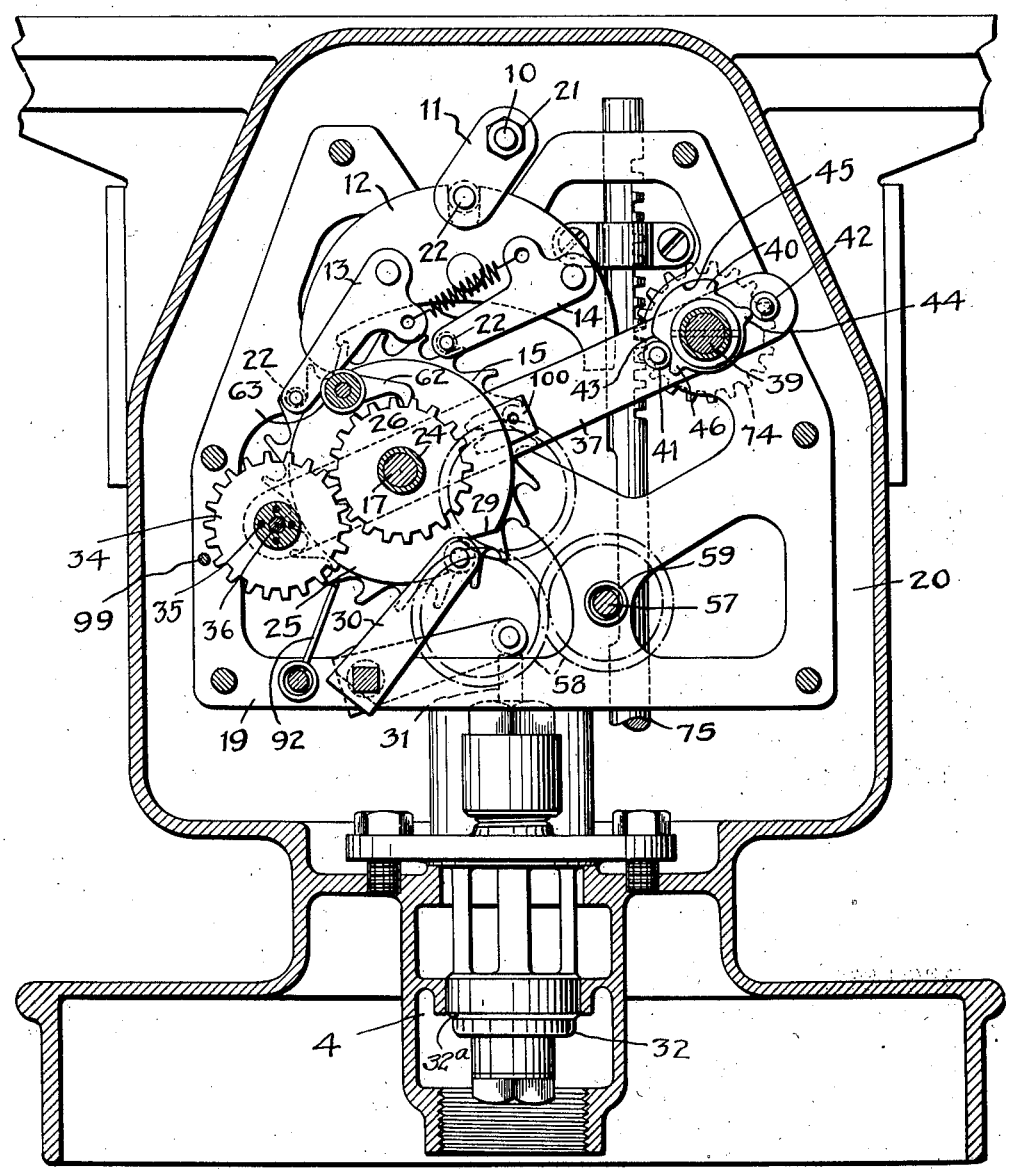

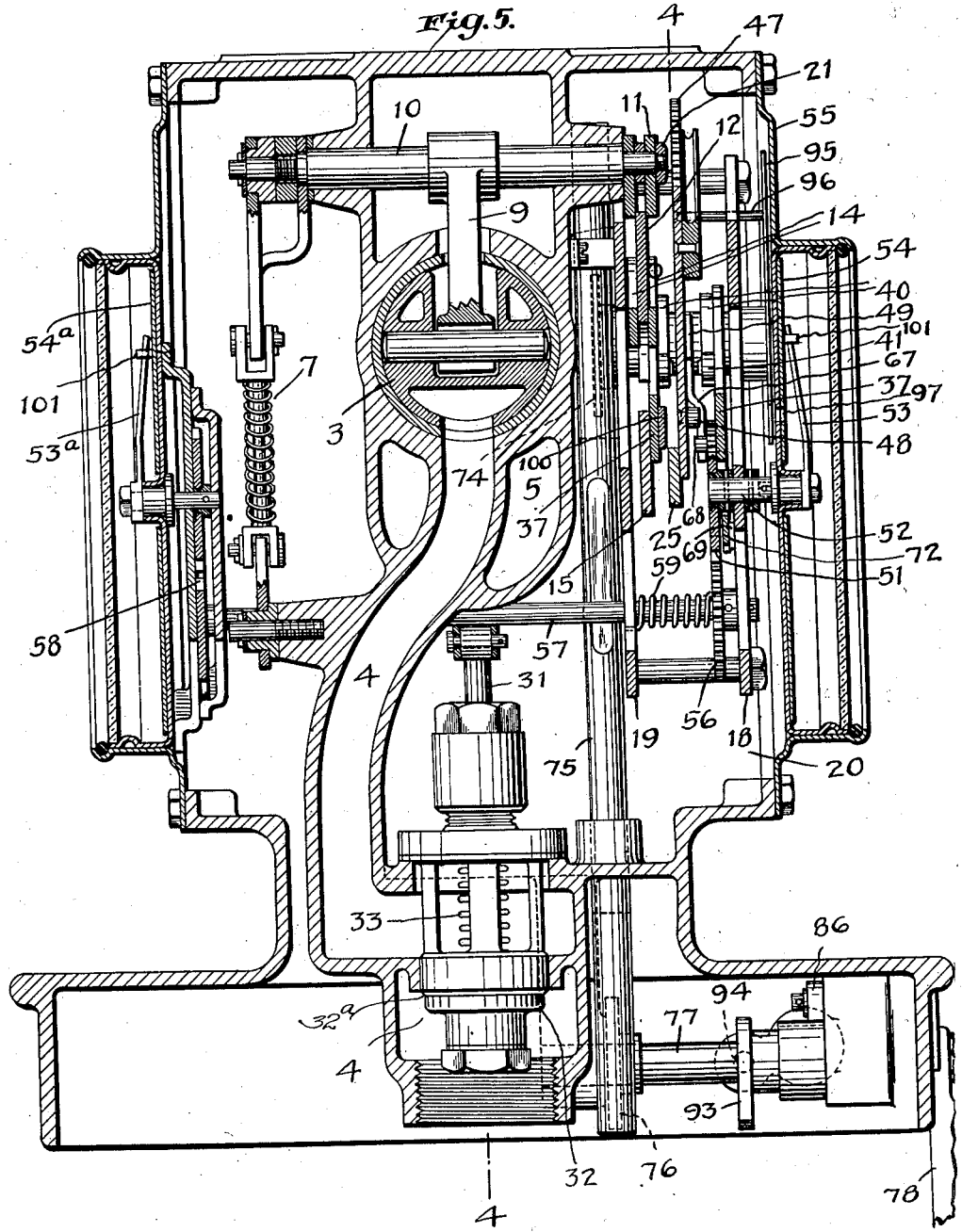

Sept. 18, 1928.
E. M. PIERCE ET AL
1,684,926
PREDETERMINER AND INDICATOR
Filed Dec. 14, 1926 7 Sheets-Sheet 7
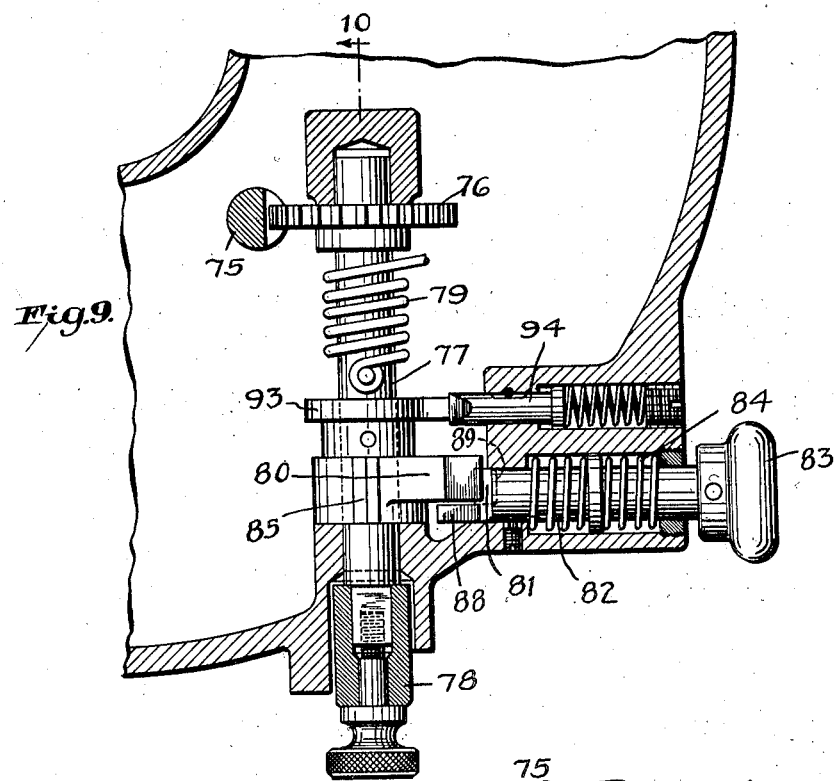
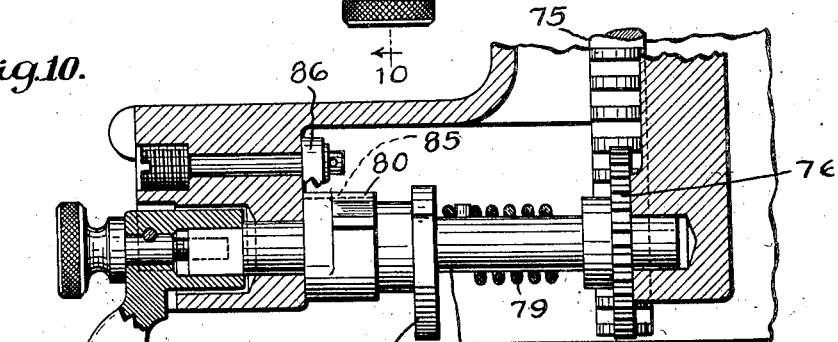

Patented Sept. 18, 1928.

1,684,926

UNITED STATES PATENT OFFICE.

EDWARD M. PIERCE AND WILLIAM M. CARROLL, OF DAYTON, OHIO, ASSIGNORS TO AUGUSTINE DAVIS, JR., OF CINCINNATI, OHIO.

PREDETERMINER AND INDICATOR.

Application filed December 14, 1926. Serial No. 154,693.

In liquid dispensers such as are used for supplying measured quantities of motor fuel, it is known to provide a predeterminer which is set by the attendant for the quantity ordered by the customer, the predeterminer being moved backward with the operation of the dispenser until the intended amount has been delivered, whereupon the predeterminer causes the operation of the dispenser to cease. It is also known to provide a customer's dial or indicator which remains stationary while the predeterminer is being set and which progresses from zero to the amount delivered during the dispensing operation. It is also known to provide means whereby the predeterminer can be reset for a supplemental delivery in case the customer decides that he wishes more than his original order, and whereby the amount of this supplementary delivery will be added on the customer's indicator to the original delivery, so that at the conclusion this indicator shows the total of the amounts delivered. It is also known to bias the customer's indicator to zero by a spring, so that it will return instantly to normal position when released by a resetting operation.

The object of this invention is to provide a mechanism which has these and other capabilities, including a provision whereby the predeterminer is also automatically reset by a spring or other biasing means, which employs positive connections between the predeterminer and the indicator and the part which is operated with the operation of the dispenser, which is very convenient to set and reset, which is well safeguarded against short deliveries resulting from carelessness or trickery, which is cheap to manufacture, reliable, and easy to service and repair, and which is generally novel and advantageous in construction and operation.

In the accompanying drawings forming a part hereof:

Fig. 3 is a view similar to Fig. 2, but omitting the front plate of the interior frame and also the setting indicator and showing parts of the mechanism in the positions which they would assume when the operating handle is moved to set the mechanism for a delivery, portions in the lower part of the view being shown broken away and in vertical section;

Fig. 4 is a vertical sectional view, taken on the irregular line 4—4 of Fig. 5, the parts being in the same positions as in Fig. 2;

Fig. 5 is a central vertical section on the line 5—5 of Fig. 2;

Figure 1:
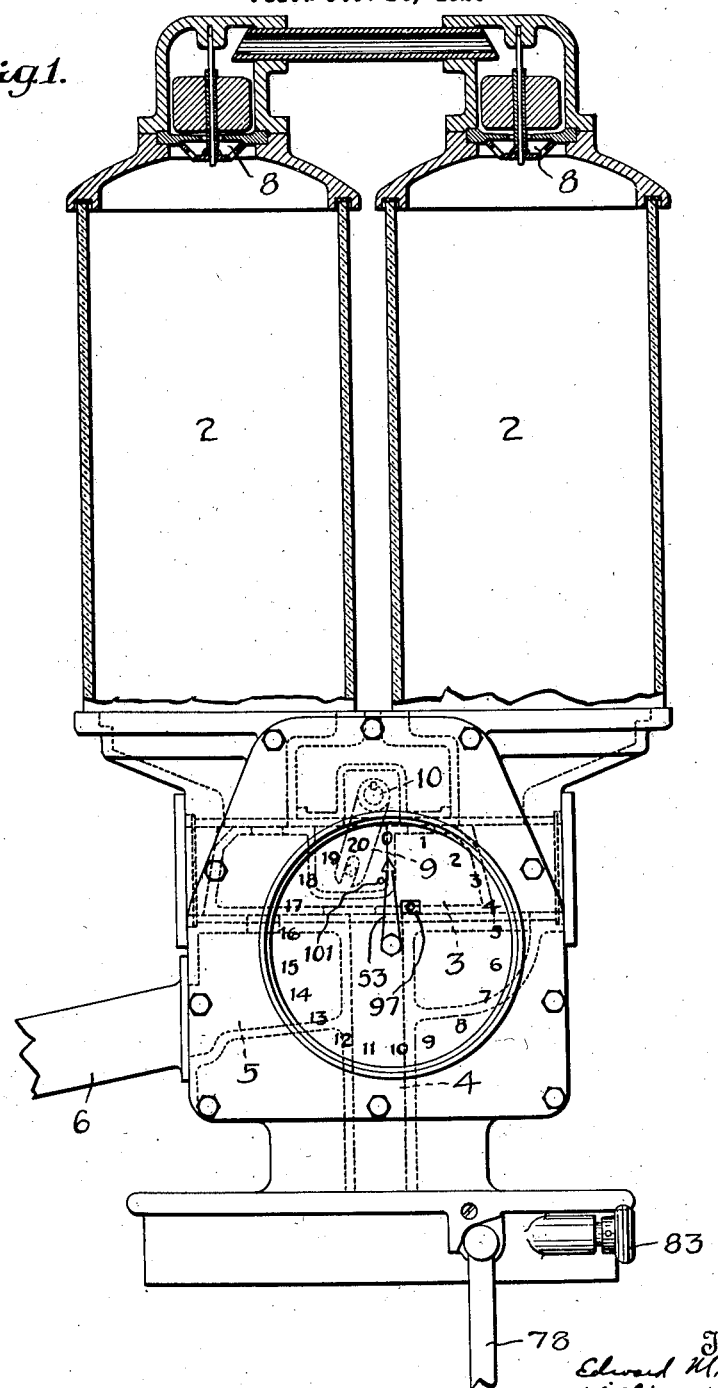
Fig. 1 is a view in front elevation in vertical section of the upper part of a dispenser embodying the invention, the operating handle and the delivery nozzle being broken away.
Figure 2:
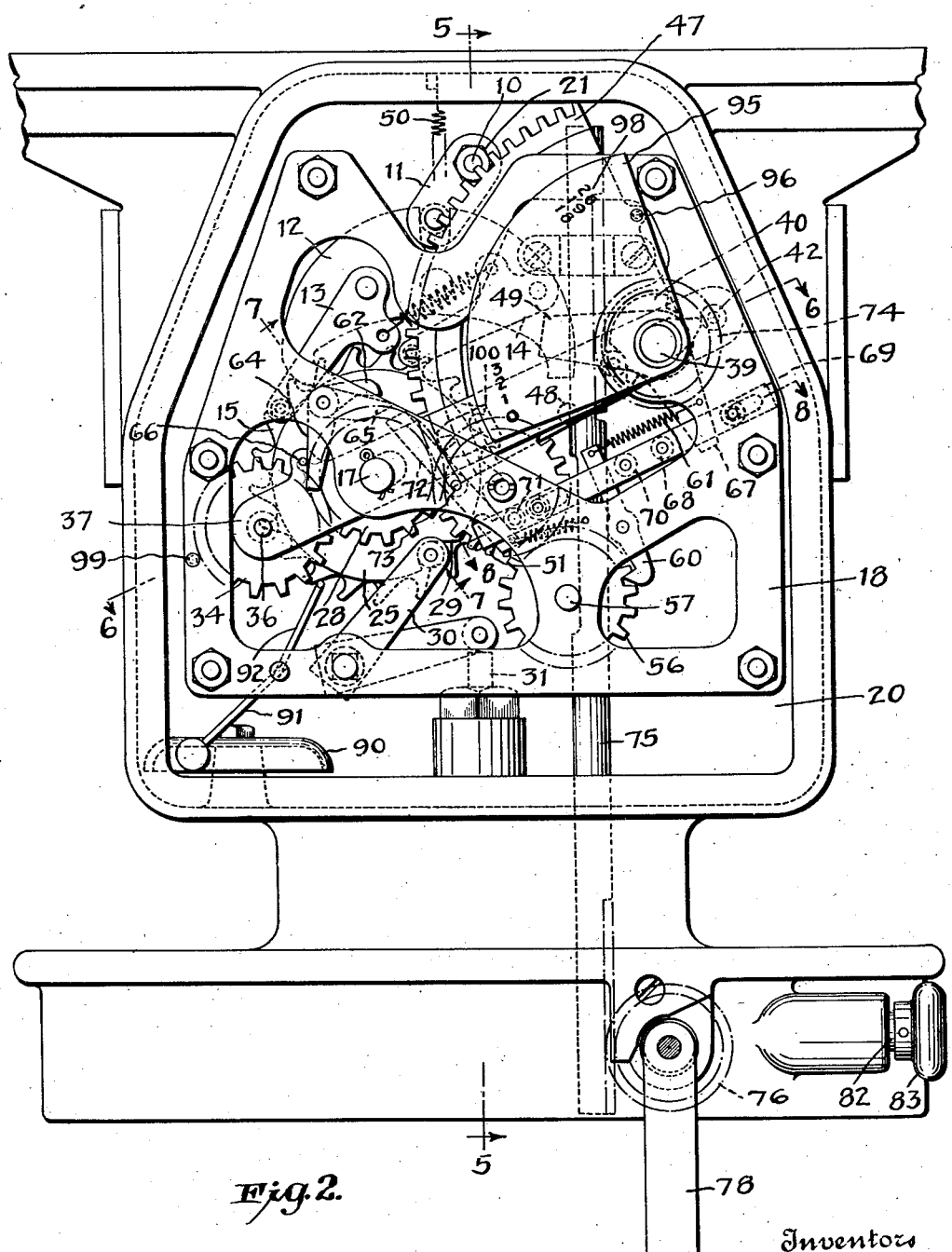
Fig. 2 is an elevation of the body frame containing the predetermining and indicating mechanism, the face plate and dial having been removed to show the parts within; the said parts and the operating handle being in normal position.

Figs. 6, 7 and 8 are sections, respectively, on the lines 6—6, 7—7 and 8—8 of Fig. 2;

Fig. 9 is a section on the line 9—9 of Fig. 3;

Fig. 10 is a section on the line 10—10 of Fig. 9; and

Fig. 11 is a fragmentary view showing in the normal position parts which are seen in the lower part of Fig. 3 in an actuated position.

The invention is not limited to the particular type of measuring dispenser, but has been illustrated in connection with a dispenser having two measuring chambers 2, each of which with its entrance spaces is of accurate unit capacity. A reciprocatory four-way piston and valve 3 alternately reverses the direction of flow to and from these chambers, so that one chamber is filling while the other is emptying, and vice versa. The numeral 4 designates a supply conduit, through which liquid is supplied under suitable moderate pressure, as from a hand-operated pump not shown. 5 is the discharge chamber having a nozzle outlet 6, to which a hose may be connected.

The valve 3 is operated as long as the supply of liquid continues. This may be accomplished by causing a pressure, which develops in each chamber when it becomes filled to act upon the valve to initiate a movement thereof to reverse the conditions of flow, the movement of the valve in each direction being taken up in advance of the center point and completed by a snap-over device 7, such as disclosed in the application of Paul S. Shield, filed August 17, 1926, Serial No. 129,761. Such pressure may be created in the chambers as the result of the closing of float-operated vent valves 8.

The valve 3 is therefore representative of a part which has movement in the regular operation of the measuring dispenser. Its movement is transmitted in this instance through an arm 9 to a rock-shaft 10, to one end of which the mechanism 7 is connected.

On the other end of said rock-shaft is an arm 11, which oscillates a double-acting pawl carrier 12, the pawls 13 and 14 of which impart rotary movement to a ratchet wheel 15.

The ratchet wheel 15 is fixed to a sleeve 16, which turns on a shaft 17, which is mounted in the front and rear plates 18 and 19 of a frame by which the predetermining and indicating mechanism is supported in the chamber 20, this frame and mechanism being removable bodily from the main frame. In order to permit such removal the front member of the arm 11, which is made of two spaced flat pieces embracing the rocker 12, is first taken off, this being permitted by the nut 21. Parts of the mechanism such as 11, 13 and 14 are made of thin flat pieces, which are cheap to manufacture and assemble, and support the roll bearing pins 22 at both ends. A similar construction will be observed in other parts.

A spur gear wheel 23 is fixed to the sleeve 16 of the ratchet wheel 15, the two wheels being thus united. Another sleeve 24, mounted to turn on the same shaft 17, carries a predeterminer disk 25 and a gear wheel 26 united together. A third sleeve 27 on the same shaft carries a gear wheel 28. The gear 23 may be termed a primary gear, the gear 26 the predeterminer gear, and the gear 28 the indicator gear. This group of three gears, with the ratchet wheel which receives uni-directional step-by-step movement in synchrony with the operation of the dispenser, and the predeterminer disk 25, are thus mounted in a row, or side by side, the three units on the shaft 17 being free to turn relatively to each other.

The predeterminer disk 25 has a notch 29, which cooperates with one roll-bearing end of a bell-crank lever 30, the other arm of which acts upon the stem 31 of a valve 32. This valve closes upward against a seat 32ᵃ and is urged by a spring 33 to close the supply passage 4, and is therefore an embodiment of a master element, the function of which is to render inoperable, or stop the operation of, the dispenser when a predetermined quantity has been delivered. The master element may have, however, various other forms, and act in specifically different ways. When the end of the bell-crank rests in the notch 29, the valve is closed, but when the predetermined disk 25 is turned so as to cam the roller end of the bell-crank out of the notch and sustain it on the circular periphery of the disk, the valve is forced open and the dispenser can then be operated. The distance to which the disk is turned determines the quantity which will be delivered before the valve closes.

The gears 23, 26 and 28 are meshed by an intermediate gear device 34, preferably constructed of three toothed wheels united by pins 35, this gear device meshing simultaneously with the three gears 23, 26 and 28. The shaft 36 about which the gear device 34 turns is mounted in one end of a shiftable carriage, consisting of two spaced plates or bars 37, 37. The members of this carriage have slots 38, by means of which they are supported and guided at the shaft 17, and at another shaft 39.

The shaft 39 is a rock-shaft having twin cams 40 fixed to it, these cams coacting with front and rear rolls 41 and 42 on the members of the carriage. The front rolls normally rest in recesses 43 of the cams, projections 44 of the cams then acting upon the rear rolls so as to hold the carriage 37, 37 positively in its rearward position, in which position the gear unit 34 is meshed with the gears on the axis 17. When the rock-shaft 39 is turned in a counter-clockwise direction, the rolls 41 are thrust forward and are held forward on dwell portions 45 of the cams, these portions being of considerable extent. When the rock-shaft is moved clockwise from normal position, other projections 46 of the cams likewise thrust the rollers 41 forward. In either event, the carriage 37, 37 is shoved forward so as to carry the gear unit 34 out of mesh with the gears 23, 26 and 28.

A large gear segment 47 is mounted loosely on the shaft 39. This segment is a predeterminer setting gear meshing with the predeterminer gear 26. There is a pin 48 on one side of this gear segment 47 to cooperate with an arm 49, which is fixed to the rock-shaft 39. As shown in Fig. 2, this arm is spaced away from the pin 48 in the normal condition of the parts, so that turning of the rock-shaft 39 in a counter-clockwise direction will first shift the carriage 37 so as to unmesh the gears, after which the lost motion between the arm 49 and the pin 48 is taken up and the setting gear is operated to set the predeterminer. A spring 50 connected to the setting gear 47 will act to return the setting gear and the predeterminer to normal position.

The indicator gear 28 meshes with a spur wheel 51, which is fixed to the arbor 52 of the indicating hand 53, which operates over a dial 54 carried by the cover plate 55. Another spur wheel 56 meshes with the wheel 51, the wheel 56 being fixed to a shaft 57, which extends across to the other side of the main frame, where, through a gear train 58, it drives the indicator hand 53ᵃ operating over a dial 54ᵃ. These two indicator dials and hands constitute the visual part of the customer's indicator, and the gearing is such that each pointer travels in a clockwise direction as viewed from the outside, the hands progressing from zero to the amount of gasoline delivered. A spring 59 on the shaft 57 biases the indicator to zero, and will return both hands to zero position when it is permitted. A detent 60, which is urged by a spring 61, and engages with the teeth of the wheel 56, acts to prevent such return or resetting movement of the indicator under the action of the spring 59, the pawl permitting, however, the movement of the wheel in the other or counting direction.

Another one-way-acting detent or pawl 62 coacts with the predeterminer gear 26, this pawl being pressed by a spring 63 and having two arms 64, 65 united to it. The arm 64 is pressed by a pin 66 on the carriage 37, 37, so that the pawl 62 is held out of engagement with the wheel 26 when the gears are in mesh. When, however, the carriage 37, 37 is moved to unmesh the gears, the pawl 62 automatically takes into the teeth of the gear 26 so as to hold the predeterminer against displacement. The predeterminer disk may now be turned in the setting direction, the pawl 62 keeping the predeterminer from turning backward under the action of the spring 50. When the carriage is shifted to reengage the gears, the pawl 62 is automatically withdrawn from engagement with the gear 26.

Both pawls 60 and 62 are disengaged from the wheels 26 and 56 when the rock-shaft 39 is moved in the clockwise direction. This is brought about by an arm 67, which is fixed to the rock-shaft, and which under this condition bears against a roller 68 on a reciprocatory slide 69, this slide having a roller 70 to bear against the tail of the pawl 60 to move said pawl out of engagement with the wheel 56. Another roller 71 on the said slide acts upon a two-armed lever 72, which is fulcrumed on the pivot 73, the upper end of this lever coacting with the arm 65 so as to withdraw the pawl 62.

A setting indicator plate or segment 95 is united to the setting gear 47 by a pin 96, so as to operate behind a window 97 in the dial 54. This indicator plate carries a series of numerals 98, some of which are represented in Fig. 2. These numerals are the same as those which are placed on the indicator dials 54, 54ª, and in the illustrated case run from zero to 20, twenty gallons being the maximum delivery for which the particular mechanism is designed, though obviously the mechanism may be arranged for either larger or smaller maximum deliveries. In normal condition, zero on the plate 95 is seen through the window 97, the other numerals being concealed. When the predeterminer is set, the numeral corresponding to the number of gallons to be delivered appears in the window, and during the delivery the plate 95 moves backward step-by-step until at the conclusion of the delivery the zero sign is again behind the window.

A stationary pin 99 carried by the removable frame 18, 19 is arranged to clear the teeth of the shiftable gear unit 34 when the latter is in mesh with the gears on the axis 17, but to engage between the teeth of this gear unit when the latter is shifted out of mesh, so as to lock the said gear unit against movement about its axis and to insure proper re-engagement with the gears on the axis 17 when the gears are re-engaged. A locking dog or tooth 100 is secured on the rear bar of the carriage 37, 37 in such position as to clear the gear 23 when the gears are in mesh but to engage with the teeth of said gear and lock it against displacement when the carriage is shifted to unmesh the gears.

The rock-shaft 39 also carries a pinion 74, which meshes with rack teeth on a vertical, rectilinearly movable rod 75, which extends downward in the main frame for a substantial distance. Rack teeth on the lower portion of this rod are meshed by a pinion 76 fixed to a horizontal rockshaft 77, at the outer end of which an operating handle 78 is fixed. A spring 79 connected to the shaft 77 urges the same in a clockwise direction. In the normal condition the handle 78 preferably hangs vertical, as shown in Fig. 2. An arm 80 on the shaft 77, inside the case, normally bears on top of the stop portion 81 of a pin 82, thereby keeping the spring 79 from rotating the shaft 77 past the normal position. The pin 82 has a handle 83 on its outer end, by means of which the attendant can either push the pin inward or pull it outward, springs 84 acting upon the pin to hold it yieldingly in mid position. A series of ratchet teeth 85 are also carried by the rock-shaft 77 to cooperate with a dog 86, which is mounted on a fixed pivot, the arrangement being such that the ratchet teeth of the shaft will be caught by the dog when the shaft is turned in a clockwise direction from the normal position. The dog 86 has a finger 87, to be acted upon by a bevel nose 88 on the pin 82. The stop portion 81 of said pin is beveled on the under side, as indicated at 89.

A bell 90 sounds at each delivery of a gallon or other unit, the striker 91 having a tail 92 which is acted upon by the teeth of the ratchet wheel 15.

A ratchet wheel or segment 93 having V teeth is fixed to the shaft 77 to cooperate with a spring-pressed pawl 94. The engagement between these parts is of an impositive character, permitting the shaft 77 to turn in either direction, the teeth of the ratchet clicking beneath the pawl, the function of the device being that of a positioner insuring that the predeterminer and its gear 26 will always be set in exact position for any delivery. The operator may also be able to tell when he has moved the handle 78 far enough in the setting direction by counting the clicks as the teeth of the ratchet 93 pass the pawl, as well as by observing the numerals as they appear in the window 97.

The operation will now be briefly described. Let it be assumed that the customer wishes five gallons. The attendant grasps the handle 78 and moves it from the position of Fig. 2 in a counter-clockwise direction to the position of Fig. 3. This draws the rod 75 downward and turns the predeterminer setting gear 47 and the setting indicator plate 95 in the counter-clockwise direction, with the result that the numeral 5 appears in the window 97 and that the predeterminer disk 25 is turned in a clockwise direction the proper distance for the delivery of five gallons. The turning of the predeterminer disk cams the bell-crank 30 out of the stop notch 29 onto the circular periphery of the disk and opens the master valve 32. Just before the arm 49 came into contact with the pin 48 to move the predeterminer, the cam 40 actuated the carriage 37, 37 so as to shift the gear unit 34 out of mesh with the predeterminer gear 26, thereby freeing the predeterminer for setting. The pawl 62 then automatically engaged the predeterminer gear 26, so as to hold the same against retrograde movement, the stationary pin 99 locking the gear unit 34 against displacement, the gear 23 being locked by the dog 100, and the indicator gear 28 being also held through the pawl 60 and the gears 56, 51 against displacement, so that the gear 34 will re-engage properly with the set of three gears 23, 26 and 28 when the carriage is restored to normal position on return of the handle 78 to its normal position. When this is done, the mechanism is ready for the delivery, and it will be noted that the return of the carriage 37, 37 to normal position automatically disengages the pawl 62 from the predeterminer gear 26, so that the predeterminer may be turned in a counter-clockwise direction during the delivery operation.

The attendant then operates the pump, not shown, to deliver liquid to the measuring chambers 2, 2 in alternation, the pressure on the liquid acting in connection with the device 7 to reciprocate the piston valve 3 to reverse the conditions of flow between the supply passage 4, the vessels 2, 2, and the delivery nozzle 6. The movement of the member 3 is communicated to the rocker 12 with its pawls 13 and 14 to turn the ratchet wheel 15 and the gear 23 united thereto in a counter-clockwise direction proportionately as the delivery proceeds. The gear 23 drives the connecting gear unit 34, which in turn drives the predeterminer gear 26 and the indicator gear 28. This turns the predeterminer 25 in a counter-clockwise direction, or permits it to be so turned by the action of the spring 50, and the predeterminer setting gear 47 and the setting indicator plate 95 are likewise turned in clockwise directions toward their normal position. When the roll on the end of the bell-crank 30 drops into the notch 29, the desired number of gallons has been delivered and the valve 32 closes so as to stop further operation of the dispenser. The turning of the indicator gear 28 during the delivery caused the indicator hands 53 and 53$^a$ of the customer's indicator, or the delivery indicator, as it may also be termed, to progress over the dials 54, 54$^a$ from zero to the amount delivered, that is to say in the instance assumed, five gallons. At this time, therefore, five gallons shows on the delivery indicator, while the setting indicator shows zero.

Now let it be assumed that the customer finds that his tank is not full and that he wants two more gallons. The attendant moves the handle 78 from the vertical position in the same direction as before, a sufficient distance to cause the numeral 2 on the setting indicator to come beneath the window 97, thereby turning the predeterminer a distance corresponding to two gallons and reopening the valve 32. As before, the gear unit 34 is moved out of mesh with the gears 23, 26 and 28. The delivery indicator hands 53, 53$^a$ would then return to zero under the action of the spring 59, but are prevented from doing so by the detent 60 engaging the wheel 56. Consequently the customer's or delivery indicator remains at 5 gallons. The attendant again operates the pump to deliver the additional two gallons, and these are added on the delivery indicator, which at the conclusion of the transaction shows 7 gallons on the dials.

If the transaction is now closed, the attendant pulls the knob 83 outward and moves the handle 78 in a clockwise direction from its normal or vertical position. This raises the rod 75 and causes the cam portions 46 to shift the carriage 37, 37 so as to unmesh the gear connection between the ratchet wheel 15, on the one hand, and the predeterminer and the delivery indicator, on the other hand. This movement of the operating handle also causes the arm 67 on the rock-shaft 39 to act upon the slides 69, with the result that both of the detents 60 and 62 are disengaged from their respective wheels 56 and 26. The disengagement of the detent 60 frees the delivery indicator to return instantly to zero under the action of the spring 59. In this particular instance the disengagement of the detent 62 from the predeterminer gear 26 had no effect, but if the delivery had been stopped before the full amount had been delivered, as would be the case if the customer found that his tank could not hold the full amount, the release of this detent would also permit the predeterminer to be reset to zero by the action of the spring 50.

When the attendant moved the handle 78 in the clockwise direction for resetting, the pawl or detent 86 dropped into engagement with the ratchet teeth 85 carried by the shaft 77, thereby making it impossible for the attendant to quickly snap the handle 78 back to the normal position and catch the delivery indicator before the hands 53 and 53ᵃ had returned all the way to zero. If a dishonest attendant were able to do that, the indicator might be caught at one or two gallons after a delivery, making it possible to cheat a succeeding customer. Before the handle 78 can be returned to the normal position, it is necessary for him to push in quickly on the knob 83 so as to throw the detent 86 clear of the teeth 85, and this he can not do until the arm 80 has cleared the end of the portion 89 of the plunger 82, the result being that a sufficiently full stroke is insured to guard against trickery. On the return movement the arm 82 encounters the sloping under side of the portion 89 and cams it out of the way.

Pins 101 are shown acting as stops in connection with the delivery hands to rest them on returning to zero. Any other suitable indicator stop may be arranged for the same purpose.

It will be noted that the ends of the pawl rocker 12 are formed to act as stops by contacting with the ratchet wheel 15 at the end of each movement of the rocker. This insures precisely equal movements of the predeterminer and indicator mechanism during the delivery operation, and also affords a stop to limit the movement of the valve 3 in each direction, though other stops may be provided for this latter purpose if desired.

What we claim as new is:

1. In a measuring dispenser having a master valve for rendering the dispenser inoperable when a predetermined quantity has been delivered,—a predetermining mechanism comprising the combination with a part which is operated with the operation of the dispenser, of a predeterminer controlling said master valve, a connection between said predeterminer and said master valve whereby movement of the predeterminer automatically opens said valve, a positive connection of meshing toothed gear elements between said predeterminer and said part, means for setting said predeterminer, for first disengaging elements of said connection, and for reengaging the same when the predeterminer has been set.

2. In a measuring dispenser having a master valve for rendering the dispenser inoperable when a predetermined quantity has been delivered,—a predetermining mechanism comprising the combination with a part which is operated with the operation of the dispenser, of a predeterminer controlling said master valve, a connection between said predeterminer and said master valve whereby movement of the predeterminer automatically opens said valve, a positive connection of meshing toothed gear elements between said predeterminer and said part, means for setting said predeterminer, for first disengaging elements of said connection, and for re-engaging the same when the predeterminer has been set, and means for holding the predeterminer against unintended displacement while it is disconnected from said part in the setting operation.

3. In a measuring dispenser having a master element for rendering the dispenser inoperable when a predetermined quantity has been delivered,—a predetermining mechanism comprising the combination with a part which is operated with the operation of the dispenser, of a predeterminer controlling said master element, a positive connection of meshing toothed gear elements between said predeterminer and said part, means for setting said predeterminer, for first disengaging elements of said connection, and for reengaging the same when the predeterminer has been set, means biasing said predeterminer toward normal position, and a detent for holding said predeterminer against return to normal while it is disconnected from said part in the setting operation, said detent being automatically disengaged when the connection between said predeterminer and said part is restored.

4. In a measuring dispenser having a master element for rendering the dispenser inoperable when a predetermined quantity has been delivered,—a predetermining mechanism comprising the combination with a part which is operated with the operation of the dispenser, of a predeterminer controlling said master element, a positive connection of meshing toothed gear elements between said predeterminer and said part, means for setting said predeterminer, for first disengaging elements of said connection, and for reengaging the same when the predeterminer has been set, means biasing said predeterminer toward normal position, a detent for holding said predeterminer against return to normal while it is disconnected from said part in the setting operation, said detent being automatically disengaged when the operative connection between said predeterminer and said mechanism is restored, and means for disconnecting the predeterminer from said part and for also disengaging said detent to permit the biased predeterminer to reset itself.

5. In a measuring dispenser having a master element for rendering the dispenser inoperable when a predetermined quantity has been delivered,—a predetermining mechanism comprising the combination with a part which is operated with the operation of the dispenser, of a predeterminer controlling said master element, an operative connection between said predeterminer and said part, means for setting said predeterminer and for first disconnecting the same from said part, means biasing said predeterminer toward normal position, and a detent for holding said predeterminer against return to normal while it is disconnected from said part in the setting operation, said detent being automatically disengaged when the operative connection between said predeterminer and said part is restored.

6. In a measuring dispenser having a master element for rendering the dispenser inoperable when a predetermined quantity has been delivered,—a predetermining mechanism comprising the combination with a part which is operated with the operation of the dispenser, of a predeterminer controlling said master element, an operative connection between said predeterminer and said part, means for setting said predeterminer and for first disconnecting the same from said part, means biasing said predeterminer toward normal position, a detent for holding said predeterminer against return to normal while it is disconnected from said part in the setting operation, said detent being automatically disengaged when the operative connection between said predeterminer and said part is restored, and means for disconnecting the predeterminer from said part and for also disengaging said detent to permit the biased predeterminer to reset itself.

7. In a measuring dispenser having a master valve for rendering the dispenser inoperable when a predetermined quantity has been delivered,—a predetermining mechanism comprising the combination with a part which is operated with the operation of the dispenser, of a predeterminer controlling said master valve, a connection between said predeterminer and said master valve whereby movement of the predeterminer automatically opens said valve, a positive connection between said predeterminer and said mechainsm, and setting means which acts first to disconnect said positive connection and then to set the predeterminer.

8. In a measuring dispenser having a master element for rendering the dispenser inoperable when a predetermined quantity has been delivered,—a predetermining mechanism comprising the combination with a part which is operated with the operation of the dispenser, of a predeterminer controlling said master element, an operative connection between said predeterminer and said part, means biasing said predeterminer toward normal position, a detent for holding said predeterminer against return to normal when the predeterminer is disconnected from said part, and means operated by a single handle for disconnecting and setting the predeterminer and then reconnecting the same with said part, said detent being automatically disengaged when the predeterminer is reconnected, the means operated by said handle acting by another movement to disconnect the predeterminer and disengage said detent to permit the biased predeterminer to reset itself.

9. In a measuring dispenser having a master element for rendering the dispenser inoperable when a predetermined quantity has been delivered,—a predetermining and indicating mechanism comprising the combination with a rotary part which is operated with the operation of the dispenser, of a predeterminer controlling said master element, an indicator which progresses from zero to the amount delivered, positive connections for connecting said predeterminer and indicator with said part, means biasing said predeterminer and indicator to return to normal positions, means for disconnecting setting and reconnecting the predeterminer, and means for disconnecting both the predeterminer and the indicator for resetting.

10. In a measuring dispenser having a master element for rendering the dispenser inoperable when a predetermined quantity has been delivered,—a predetermining and indicating mechanism comprising the combination with a rotary part which is operated with the operation of the dispenser, of a predeterminer controlling said master element, an indicator which progresses from zero to the amount delivered, positive connections for connecting said predeterminer and indicator with said part, means biasing said predeterminer and indicator to return to normal positions, means for disconnecting the connections of both the predeterminer and the indicator and for setting the predeterminer, detents for holding the predeterminer and indicator against return to normal when disconnected, and means for disengaging said detents for resetting.

11. In a measuring dispenser having a master element for rendering the dispenser inoperable when a predetermined quantity has been delivered,—a predetermining and indicating mechanism comprising the combination with a rotary part which is operated with the operation of the dispenser, of a predeterminer controlling said master element, an indicator which progresses from zero to the amount delivered, positive connections for connecting said predeterminer and indicator with said part, means biasing said predeterminer and indicator to return to normal positions, means operated by a common handle to disconnect the connections of both the predeterminer and the indicator and to set the predeterminer, and detents for holding the predeterminer and indicator against return to normal when disconnected, the means operated by said handle acting by another movement to disconnect said connections and disengage said detents for resetting.

12. In a measuring dispenser having a master element for rendering the dispenser inoperable when a predetermined quantity has been delivered,—a predetermining and indicating mechanism comprising the combination with a rotary part which is operated with the operation of the dispenser, of a predeterminer controlling said master element, an indicator which progresses from zero to the amount delivered, positive connections for connecting said predeterminer and indicator with said part, means biasing said predeterminer and indicator to return to normal positions, means operated by a single handle to disconnect the connections of both the predeterminer and the indicator and to set the predeterminer, detents for holding the predeterminer and indicator against return to normal when disconnected, and means whereby the detent of the predeterminer is disengaged upon reconnection of the predeterminer, the means operated by said handle acting by another movement to disconnect said connections and disengage said detents for resetting.

13. In a measuring dispenser having a master element for rendering the dispenser inoperable when a predetermined quantity has been delivered,—a predetermining mechanism comprising the combination of a toothed gear wheel which is operated with the operation of the dispenser, a predeterminer having a gear wheel, said predeterminer controlling said master element, an intermediate gear wheel device meshing with the aforesaid gear wheels, and means for shifting said intermediate gear wheel device out of mesh when the predeterminer is to be set.

14. In a measuring dispenser having a master element for rendering the dispenser inoperable when a predetermined quantity has been delivered, a predetermining and indicating mechanism comprising the combination of a primary toothed gear wheel which is operated with the operation of the dispenser, a predeterminer having a gear wheel, said predeterminer controlling said master element, an indicator having a gear wheel, an intermediate gear wheel device meshing on the one hand with said primary wheel and on the other hand with the gear wheels of the predeterminer and the indicator, and means for shifting said intermediate gear wheel device out of mesh.

15. In a measuring dispenser having a master element for rendering the dispenser inoperable when a predetermined quantity has been delivered, a predetermining and indicating mechanism comprising the combination of a predeterminer controlling said master element, an indicator, three toothed gears mounted in a row, the same being a gear which is operated with the operation of the dispenser, a predeterminer gear, and an indicator gear, an intermediate gear device which meshes simultaneously with said three gears, and means for shifting said intermediate gear device into and out of mesh.

16. In a measuring dispenser having a master element for rendering the dispenser inoperable when a predetermined quantity has been delivered, a predetermining and indicating mechanism comprising the combination of a ratchet wheel, oscillatory means for turning said ratchet wheel step by step with the operation of the dispenser, a spur gear united to said ratchet wheel, a predeterminer controlling said master element, a predeterminer gear, an indicator gear, the aforesaid elements being mounted in a row, an intermediate gear device which meshes simultaneously with said three gears, and means for shifting said intermediate gear device into and out of mesh.

17. In a measuring dispenser having a master element for rendering the dispenser inoperable when a predetermined quantity has been delivered, a predetermining and indicating mechanism comprising the combination of a predeterminer controlling said master element, an indicator, three toothed gears mounted in a row, the same being a gear which is operated with the operation of the dispenser, a predeterminer gear, and an indicator gear, an intermediate gear device which meshes simultaneously with said three gears, a carriage for said intermediate gear device, setting means geared to said predeterminer, and means operated by a handle for first shifting said carriage to unmesh the gears and then operate said setting means.

18. In a measuring dispenser having a master element for rendering the dispenser inoperable when a predetermined quantity has been delivered, a predetermining and indicating mechanism comprising the combination of a predeterminer controlling said master element, an indicator, three toothed gears mounted in a row, the same being a gear which is operated with the operation of the dispenser, a predeterminer gear, and an indicator gear, an intermediate gear device which meshes simultaneously with said three gears, a carriage for said intermediate gear device, a setting gear meshing with the predeterminer gear, and a shaft having means for shifting said carriage to unmesh the gears and a lost-motion connection for sequential operation of the setting gear.

19. In a measuring dispenser having a master element for rendering the dispenser inoperable when a predetermined quantity has been delivered, a predetermining and indicating mechanism comprising the combination of a predeterminer controlling said master element, an indicator, three toothed gears mounted in a row, the same being a gear which is operated with the operation of the dispenser, a predeterminer gear, and an indicator gear, an intermediate gear device which meshes simultaneously with said three gears, a carriage for said intermediate gear device, a setting gear meshing with the predeterminer gear, and a shaft co-axial with said setting gear and having means for shifting said carriage to unmesh the gears and a lost-motion connection for sequential operation of the setting gear.

20. In a measuring dispenser having a master element for rendering the dispenser inoperable when a predetermined quantity has been delivered, a predetermining and indicating mechanism comprising the combination of a predeterminer controlling said master element, an indicator, three toothed gears mounted in a row, the same being a gear which is operated with the operation of the dispenser, a predeterminer gear, and an indicator gear, an intermediate gear device which meshes simultaneously with said three gears, a rectilinearly movable carriage formed of bars carrying said intermediate gear, a predeterminer setting gear, and a shaft having a cam for acting on said carriage and a lost-motion connection for sequential operation of said predeterminer setting gear.

21. In a measuring dispenser having a master element for rendering the dispenser inoperable when a predetermined quantity has been delivered, a predetermining and indicating mechanism comprising the combination of a predeterminer controlling said master element, an indicator, three toothed gears mounted in a row, the same being a gear which is operated with the operation of the dispenser, a predeterminer gear, and an indicator gear, an intermediate gear device which meshes simultaneously with said three gears, a carriage for said intermediate gear device movable to unmesh the gears, means biasing the predeterminer and the indicator to return to normal positions, detents for restraining the predeterminer and indicator when the gears are unmeshed, the detent for the predeterminer being automatically disengaged when the gears are meshed, means for shifting said carriage and setting the predeterminer, and means for shifting the carriage and disengaging both said detents for resetting.

22. In a measuring dispenser having a master element for rendering the dispenser inoperable when a predetermined quantity has been delivered, a predetermining and indicating mechanism comprising the combination of a predeterminer controlling said master element, an indicator, three toothed gears mounted in a row, the same being a gear which is operated with the operation of the dispenser, a predeterminer gear, and an indicator gear, an intermediate gear device which meshes simultaneously with said three gears, a carriage for said intermediate gear device movable to unmesh the gears, means biasing the predeterminer and the indicator to return to normal positions, detents for restraining the predeterminer and indicator when the gears are unmeshed, the detent for the predeterminer being automatically disengaged when the gears are meshed, and means operated by a single handle for shifting said carriage and setting the predeterminer, said means acting by another movement to shift the carriage and disengage both said detents.

23. In a measuring dispenser having a master element for rendering the dispenser inoperable when a predetermined quantity has been delivered, a predetermining and indicating mechanism comprising the combination of a predeterminer controlling said master element, an indicator, three toothed gears mounted in a row, the same being a gear which is operated with the operation of the dispenser, a predeterminer gear, and an indicator gear, an intermediate gear device which meshes simultaneously with said three gears, a carriage for said intermediate gear device movable to unmesh the gears, means biasing the predeterminer and the indicator to return to normal positions, detents for restraining the predeterminer and indicator when the gears are unmeshed, the detent for the predeterminer being automatically disengaged when the gears are meshed, a rock-shaft having means for shifting said carriage to unmesh the gears when the rock-shaft is turned in either direction from normal, a predeterminer setting gear, means whereby said setting gear is operated by turning of the rock-shaft in one direction, connections for disengaging both said detents, and means whereby said connections are operated by turning of the rock-shaft in the other direction.

24. In a measuring dispenser having a master element for rendering the dispenser inoperable when a predetermined quantity has been delivered, a predetermining and indicating mechanism comprising the combination of a primary toothed gear wheel which is operated with the operation of the dispenser, a predeterminer having a gear wheel, said predeterminer controlling said master element, an indicator having a gear wheel, an intermediate gear wheel device meshing on the one hand with said primary wheel and on the other hand with the gear wheels of the predeterminer and the indicator, a carriage for said intermediate gear device shiftable to unmesh the gears, a predeterminer setting gear, a shaft having means for shifting said carriage and for actuating said setting gear, a vertically movable rod geared to said shaft, and a handle geared to the lower part of said rod.

25. In a measuring dispenser having a master element for rendering the dispenser inoperable when a predetermined quantity has been delivered, a predetermining and indicating mechanism comprising the combination of a primary toothed gear wheel which is operated with the operation of the dispenser, a predeterminer having a gear wheel, said predeterminer controlling said master element, an indicator having a gear wheel, an intermediate gear wheel device meshing on the one hand with said primary wheel and on the other hand with the gear wheels of the predeterminer and the indicator, a carriage for said intermediate gear device shiftable to unmesh the gears, a predeterminer setting gear, a spring for returning the indicator to zero, a detent for restraining the indicator against such return movement, a rock-shaft having means for shifting said carriage and for actuating said setting gear when turned in one direction and for shifting the carriage and disengaging said detent when turned in the other direction, a vertically movable rod geared to said rock-shaft, and a handle geared to the lower part of said rod.

26. In a measuring dispenser having a master element for rendering the dispenser inoperable when a predetermined quantity has been delivered, a predetermining and indicating mechanism comprising the combination of a primary toothed gear wheel which is operated with the operation of the dispenser, a predeterminer having a gear wheel, said predeterminer controlling said master element, an indicator having a gear wheel, an intermediate gear wheel device meshing on the one hand with said primary wheel and on the other hand with the gear wheels of the predeterminer and the indicator, a carriage for said intermediate gear device shiftable to unmesh the gears, a predeterminer setting gear, a spring for returning the indicator to zero, a detent for restraining the indicator against such return movement, and means operated by a single handle for shifting said carriage and actuating said setting gear by one movement, and for shifting said carriage and disengaging said detent by another movement.

27. In a measuring dispenser having a master element for rendering the dispenser inoperable when a predetermined quantity has been delivered, a predetermining and indicating mechanism comprising the combination of a primary toothed gear wheel which is operated with the operation of the dispenser, a predeterminer having a gear wheel, said predeterminer controlling said master element, an indicator having a gear wheel, an intermediate gear wheel device meshing on the one hand with said primary wheel and on the other hand with the gear wheels of the predeterminer and the indicator, means for shifting said intermediate gear wheel device out of mesh, and a stationary pin for locking said intermediate gear wheel member when it is so shifted.

28. In a measuring dispenser having a master element for rendering the dispenser inoperable when a predetermined quantity has been delivered, a predetermining and indicating mechanism comprising the combination of a primary toothed gear wheel which is operated with the operation of the dispenser, a predeterminer having a gear wheel, said predeterminer controlling said master element, an indicator having a gear wheel, an intermediate gear wheel device meshing on the one hand with said primary wheel and on the other hand with the gear wheels of the predeterminer and the indicator, and means for shifting said intermediate gear wheel device out of mesh and for locking said primary wheel.

29. In a measuring dispenser having a master element for rendering the dispenser inoperable when a predetermined quantity has been delivered, a predetermining and indicating mechanism comprising the combination of a primary toothed gear wheel which is operated with the operation of the dispenser, a predeterminer having a gear wheel, said predeterminer controlling said master element, an indicator having a gear wheel, an intermediate gear wheel device meshing on the one hand with said primary wheel and on the other hand with the gear wheels of the predeterminer and the indicator, means for shifting said intermediate gear wheel device out of mesh and for locking said primary wheel, and a stationary pin for locking the intermediate gear wheel member when so shifted.

30. In a measuring dispenser having a master element for rendering the dispenser inoperable when a predetermined quantity has been delivered,—a predetermining and indicating mechanism comprising an oscillatory member which is operated with the operation of the dispenser, a ratchet-wheel, double action pawls connected to said member and cooperating with said ratchet wheel, a predeterminer and an indicator having wheels operable by said ratchet wheel, the ends of said oscillatory member being formed as stops cooperative with a wheel.

31. In a measuring dispenser having a master element for rendering the dispenser inoperable when a predetermined quantity has been delivered, the combination with a reciprocatory four-way valve, an oscillatory member connected with said valve, a ratchet-wheel, double action pawls connected to said member and cooperating with said ratchet wheel, a predeterminer and an indicator having wheels operable by said ratchet wheel, the ends of said oscillatory member being formed as stops cooperative with a wheel so as to limit the throw of said valve.

32. In a measuring dispenser having a master element for rendering the dispenser inoperable when a predetermined quantity has been delievered,—a predeterminer and indicator mechanism comprising the combination with a part which is operated with the operation of the dispenser, of a predeterminer controlling said master element and having an operative connection with said part, an indicator also having an operative connection with said part, a spring for restoring said indicator to zero, handle-operated means for disconnecting said indicator from said part to permit the indicator to return to zero, and full-stroke mechanism coacting with said handle-operated means.

33. In a measuring dispenser having a master element for rendering the dispenser inoperable when a predetermined quantity has been delivered,—a predeterminer and indicator mechanism comprising the combination with a part which is operated with the operation of the dispenser, of a predeterminer controlling said master element and having an operative connection with said part, an indicator also having an operative connection with said part, a spring for restoring said indicator to zero, handle-operated means for disconnecting said indicator from said part to permit the indicator to return to zero, a detent cooperative with said handle-operated means, a separate handle-operated device for releasing said detent, and an interference preventing release of said detent until after said handle-operated means has been moved sufficiently to insure the return of the indicator to zero.

34. In a measuring dispenser having a master element for rendering the dispenser inoperable when a predetermined quantity has been delivered,—a predetermining mechanism comprising the combination with a part which is rotated with the operation of the dispenser, of a notched predeterminer disk controlling said master element, a connection between said predeterminer and part enabling said predeterminer disk to be turned relative to said part for setting, a gear united to said predeterminer disk, a setting gear meshing the predeterminer gear, and an indicator member united to said setting gear.

35. In a measuring dispenser having a master element for rendering the dispenser inoperable when a predetermined quantity has been delivered,—a predetermining and indicating mechanism comprising the combination with a part which is rotated with the operation of the dispenser, of a predeterminer controlling said master element, a connection between said predeterminer and part enabling said predeterminer to be moved relatively to said part for setting, a wall carrying a dial and having a window, an indicator hand cooperating with said dial and connected to be driven from said part so as to progress from zero to the amount delivered, and a setting indicator connected with said predeterminer, said setting indicator being located behind said wall and bearing numerals which are visible one at a time through said window.

EDWARD M. PIERCE.
WILLIAM M. CARROLL.